US009868412B2

(12) United States Patent
Yoshida et al.

(10) Patent No.: US 9,868,412 B2
(45) Date of Patent: Jan. 16, 2018

(54) AIR-BAG

(71) Applicant: SUMISHO AIRBAG SYSTEMS CO., LTD., Matsuura-shi, Nagasaki (JP)

(72) Inventors: Masatoshi Yoshida, Matsuura (JP); Tadashi Takemoto, Matsuura (JP)

(73) Assignee: SUMISHO AIRBAG SYSTEMS CO., LTD., Matsuura-Shi (JP)

(*) Notice: Subject to any disclaimer, the term of this patent is extended or adjusted under 35 U.S.C. 154(b) by 0 days.

(21) Appl. No.: 14/901,908

(22) PCT Filed: Jul. 8, 2014

(86) PCT No.: PCT/JP2014/068116
§ 371 (c)(1),
(2) Date: Dec. 29, 2015

(87) PCT Pub. No.: WO2015/005308
PCT Pub. Date: Jan. 15, 2015

(65) Prior Publication Data
US 2016/0368448 A1    Dec. 22, 2016

(30) Foreign Application Priority Data

Jul. 9, 2013   (JP) .................................. 2013-143595

(51) Int. Cl.
*B60R 21/232*  (2011.01)
*B60R 21/2338*  (2011.01)
*B60R 21/235*  (2006.01)

(52) U.S. Cl.
CPC ........ *B60R 21/232* (2013.01); *B60R 21/2338* (2013.01); *B60R 2021/23382* (2013.01);
(Continued)

(58) Field of Classification Search
CPC .............. B60R 21/232; B60R 21/2338; B60R 2021/23382; B60R 2021/23509;
(Continued)

(56) References Cited

U.S. PATENT DOCUMENTS 1,976,793 A * 10/1934 Mangold .............. A47C 27/081
                                                     139/384 R
3,575,776 A *  4/1971 MacIntyre ............... D03D 1/02
                                                     138/384 R
(Continued)

FOREIGN PATENT DOCUMENTS

CN    101200841 A    6/2008
CN    101506430 A    8/2009
(Continued)

OTHER PUBLICATIONS

Extended European Search Report, dated Dec. 16, 2016, for European Application No. 14823709.2.
(Continued)

*Primary Examiner* — Laura Freedman
(74) *Attorney, Agent, or Firm* — Birch, Stewart, Kolasch & Birch, LLP

(57) ABSTRACT

Provided is an air-bag integrally formed by hollow weaving and including a control seam for restricting expansion. The control seam is extended from the base fabric on one surface of an expansion portion of the air-bag to the base fabric on another surface, and the base fabrics are joined. The control seam extending from the base fabric on the one surface to the base fabric on the other surface, and the control seam extending symmetrically from the base fabric on the other surface to the base fabric on the one surface constitute a pair of control seams One or more pairs of the restriction yarns are arranged in a block shape, forming a restriction yarn block. Adjacent restriction yarn blocks are disposed in a
(Continued)

parallelly staggered manner with respect to the direction in which the restriction yarns extend.

4 Claims, 13 Drawing Sheets

(52) U.S. Cl.
CPC ............... *B60R 2021/23509* (2013.01); *B60R 2021/23547* (2013.01); *B60R 2021/23576* (2013.01)

(58) Field of Classification Search
CPC   B60R 2021/23538; B60R 2021/23542; B60R 2021/23547; B60R 2021/23576; D03D 1/02; D10B 2505/124
See application file for complete search history.

(56) References Cited

U.S. PATENT DOCUMENTS

| | | | | |
|---|---|---|---|---|
| 3,598,159 | A * | 8/1971 | MacIntyre | D03D 11/00 139/384 R |
| 5,464,250 | A * | 11/1995 | Sato | B60R 21/23138 280/730.1 |
| 5,651,395 | A * | 7/1997 | Graham | B60R 21/23 139/390 |
| 5,865,464 | A * | 2/1999 | Kanuma | D03D 1/02 280/743.1 |
| 5,865,465 | A * | 2/1999 | Bauer | B60R 21/232 280/743.1 |
| 6,296,276 | B1 | 10/2001 | Ritter | |
| 6,299,965 | B1 * | 10/2001 | Keshavaraj | B29C 66/439 139/389 |
| 6,318,753 | B1 * | 11/2001 | Valkenburg | B60R 21/232 280/730.2 |
| 6,457,745 | B1 * | 10/2002 | Heigl | B60R 21/232 280/728.1 |
| 6,489,006 | B1 * | 12/2002 | Keshavaraj | B29C 66/439 139/389 |
| 7,025,375 | B2 * | 4/2006 | Drossler | B60R 21/232 139/387 R |
| 7,222,877 | B2 * | 5/2007 | Wipasuramonton | B60R 21/214 280/729 |
| 8,622,424 | B2 * | 1/2014 | Finn | B60R 21/2338 280/743.1 |
| 9,663,062 | B2 * | 5/2017 | Rohn | B60R 21/2338 |
| 2005/0253367 | A1 * | 11/2005 | Heigl | B60R 21/232 280/730.2 |
| 2007/0040368 | A1 * | 2/2007 | Manley | B60R 21/231 280/743.2 |
| 2007/0170706 | A1 | 7/2007 | Yokoyama et al. | |
| 2007/0200329 | A1 * | 8/2007 | Ma | B60R 21/231 280/743.1 |
| 2008/0135124 | A1 | 6/2008 | Shimazaki et al. | |
| 2009/0224521 | A1 * | 9/2009 | Huber | D03D 1/02 280/743.1 |
| 2010/0295283 | A1 | 11/2010 | Yamada et al. | |
| 2013/0020791 | A1 | 1/2013 | Yamamoto et al. | |
| 2015/0151710 | A1 | 6/2015 | Tanaka et al. | |
| 2016/0002831 | A1 * | 1/2016 | Becker | B60R 21/231 139/384 R |
| 2016/0264090 | A1 * | 9/2016 | Wootton | B60R 21/235 |

FOREIGN PATENT DOCUMENTS

| | | | | |
|---|---|---|---|---|
| CN | 101743149 A | | 6/2010 | |
| DE | 3903216 A1 | | 8/1990 | |
| DE | 10223189 A1 | * | 12/2003 | ........... B60R 21/233 |
| DE | 29 33 263 A1 | | 2/2013 | |
| FR | 2063535 A5 | | 7/1971 | |
| JP | 2000300393 A | * | 10/2000 | ........... A47C 31/006 |
| JP | 2001-138852 A | | 5/2001 | |
| JP | 4763121 B2 | | 8/2011 | |
| JP | 4937591 B2 | | 5/2012 | |
| JP | 2013-028241 A | | 2/2013 | |
| JP | 5204912 B1 | | 6/2013 | |
| JP | 2016097776 A | * | 5/2016 | ........... B60R 21/233 |

OTHER PUBLICATIONS

International Search Report issued in PCT/JP2014/068116, dated Oct. 7, 2014.
Chinese Office Action and Search Report, dated Sep. 20, 2016, for Chinese Application No. 201480039048.1.

\* cited by examiner

MAT WEAVE

REVERSIBLE
FIGURED WEAVE

PLAIN WEAVE

AIR-BAG

TECHNICAL FIELD

The present invention provides an air-bag that deploys and inflates by inflow of inflation gas supplied from an inflator for protecting an occupant when an automobile collides with another automobile or an obstacle, wherein the air-bag has excellent occupant protection performance while keeping a wide area to protect the occupant, and wherein the air-bag is general-purpose one and not influenced by a structural shape that varies from vehicle to vehicle.

BACKGROUND ART

Most passenger automobiles currently manufactured have an occupant protection device installed therein that, when the front side of the automobiles collide with another automobile or an obstacle (head-on collision), rapidly inflates a bag between the occupants and an automobile interior structure to ensure the safety of the occupant, namely, driver's seat and front-passenger's seat air-bags.

In recent years, more and more automobiles include a curtain air-bag system mounted thereto that is stored by being folded in the ceiling section above the side window sections or in the pillar sections of an automobile and inflates so as to cover the side window sections upon a collision in order to protect the head and other parts of the occupant not only in case of the head-on collision but also in case where the side of the automobile collides with another automobile or an obstacle (side collision).

Such an air-bag is required to provide a large coverage of an occupant protection area and to give, when the deployed air-bag abuts against the occupant, high occupant protection performance from an early stage of the abutment.

Patent Literature 1 discloses an air-bag whose inflation chamber is defined in shape by using inner base fabrics joined to outer base fabrics. However, the method of regulating the inflation by joining the inner base fabrics to the outer base fabrics as in Patent Literature 1 is undesirable in that it takes time and effort in joining the inner base fabrics to the outer base fabrics and increases the weight and the storage volume of the air-bag itself to deteriorate the storage.

Patent Literature 2 discloses an air-bag provided with a spacer formed by warps and/or wefts restricting the inflation distance of the inflation portion when the air-bag is inflated. Patent Literature 2 describes a method of defining the thickness of the inflated air-bag without any inner base fabrics joined thereto but using weaving yarns, but does not mention an arrangement of the spacer for effectively improving the occupant protection performance.

CITATION LIST

Patent Literature

PATENT LITERATURE 1: JP-B2-4937591
PATENT LITERATURE 2: JP-B2-4763121

SUMMARY OF INVENTION

Technical Problem

The present invention aims to provide an air-bag that has excellent occupant protection performance while keeping a wide area to protect the occupant, and is general-purpose one and not influenced by a structural shape that varies from vehicle to vehicle.

Solution to Problem

The present invention is an air-bag integrally formed by hollow weaving and including a restriction yarn for restricting inflation on the inside. The restriction yarn extends from a base fabric on one surface of an inflation portion of the air-bag to a base fabric on the other surface to connect both of the base fabrics, the restriction yarn extending from the base fabric on the one surface to the base fabric on the other surface, and a restriction yarn extending symmetrically from the base fabric on the other surface to the base fabric on the one surface constitute a pair of restriction yarns, one or more restriction yarns are arranged in a block shape to constitute a restriction yarn block, and adjacent restriction yarn blocks are arranged offset from each other in a manner parallel to a direction in which the restriction yarns extend.

In another embodiment of the present invention, one of the pair of restriction yarns is organized to be offset from the other one of the pair in a parallel manner.

In still another embodiment of the present invention, one of the pair of restriction yarns is organized to be shorter or longer than the other one of the pair.

In yet another embodiment of the present invention, either one of two base fabrics constituting the air-bag forms a recessed portion when the air-bag is inflated.

In a further embodiment of the present invention, the restriction yarns have a fineness that is larger than that of base fabric yarns organizing the base fabric.

Moreover, the present invention provides a curtain air-bag using the air-bag.

Here, the term symmetrically means that the pair of restriction yarns are arranged approximately symmetrically to each other relative to an axis passing through the point the restriction yarns intersect with each other and extending orthogonally to the base fabric. Accordingly, the present invention includes a configuration in which one of the pair of restriction yarns is organized to be offset from the other one of the pair in a parallel manner, a configuration in which one of the pair of restriction yarns is organized to be shorter or longer than the other one of the pair.

DESCRIPTION OF EMBODIMENTS

Figure 1:
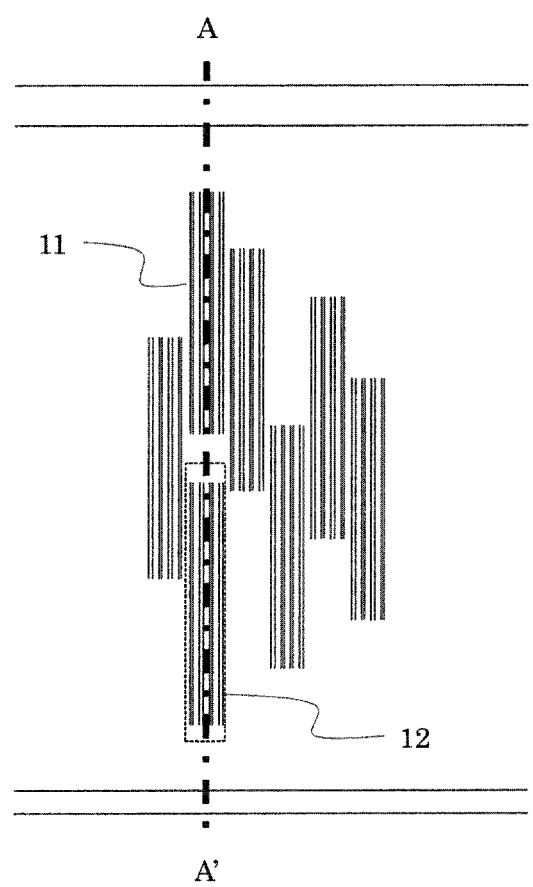
FIG. 1 shows an example arrangement pattern of restriction yarns of the present invention in which a block of restriction yarns is arranged to be offset from an adjacent block of restriction yarns in a manner parallel to the direction of the restriction yarns.
Figure 2:
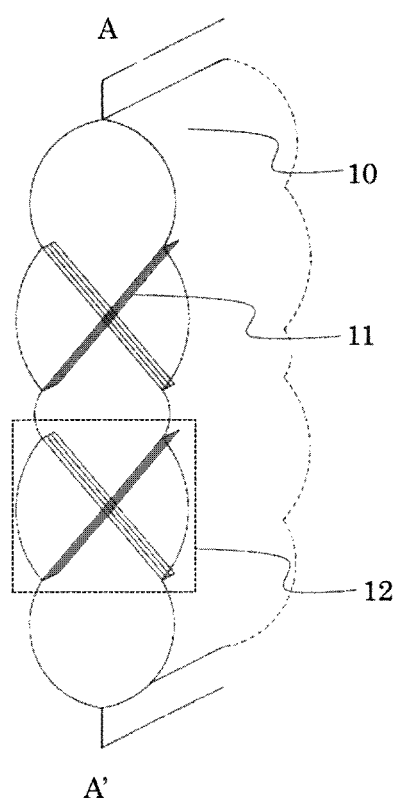
FIG. 2 shows a cross-sectional shape of an inflated state of an air-bag with the arrangement pattern of the restriction yarns in FIG. 1 taken along a line A-A'.

FIG. 1 shows an example arrangement pattern of restriction yarns of the present invention in which a block of restriction yarns is arranged offset from an adjacent block of restriction yarns in a manner parallel to the direction of the restriction yarns. FIG. 2 shows a cross-sectional shape of an inflated state of an air-bag with the arrangement pattern of the restriction yarns in FIG. 1 taken along a line A-A'.

Figure 3:
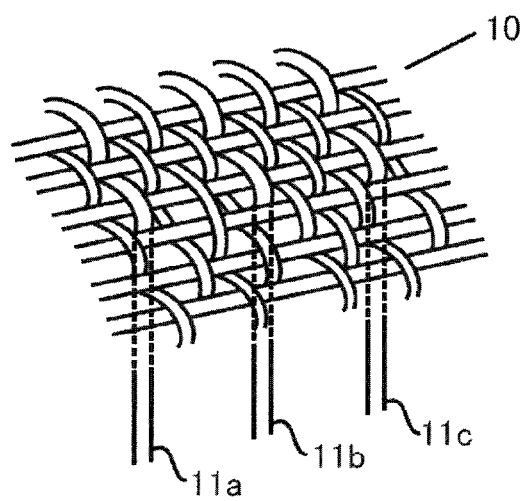
FIG. 3 is a schematic view of a point where the restriction yarns extend from one base fabric to the other.

An air-bag 10 of the present invention is integrally formed by hollow weaving, and includes, on the inside, restriction yarns 11 for restricting inflation of an inflation portion. As shown in FIG. 3, the restriction yarns 11a, 11b, and 11c are configured such that warps or wefts of the base fabric forming the inflation portion extend from one base fabric to the other base fabric.

The restriction yarns 11 are usually arranged such that two base fabrics forming the inflation portion have the same woven fabric density. For example, when a first restriction yarn exits from a first base fabric and enters into a second base fabric, a second restriction yarn exits from the second base fabric in the vicinity of a point facing the point at which the first restriction yarn has exited from the first base fabric, and then the first restriction yarn enters the first base fabric in the vicinity of a point facing the point at which the first restriction yarn enters the second base fabric. In this way, the restriction yarn extending from one base fabric to the other and the restriction yarn extending approximately symmetrically from the other base fabric to the one base fabric constitute a pair of restriction yarns. The pair of restriction yarns are arranged approximately symmetrically to each other with respect to a line passing through the point at which the pair of restriction yarns intersect with each other and extending orthogonally to the base fabrics.

The restriction yarns are arranged such that they constitute a block 12 including one or more pairs of restriction yarns, so that the restriction yarns can withstand pressure at the inflation of the air-bag.

In the air-bag 10 of the present invention, the blocks are widely distributed over the inflation portion and adjacent blocks are arranged such that they are offset from each other in a manner parallel to the extension direction of the restriction yarns in order to flatten the surface of the inflation portion which abuts against the occupant as much as possible.

Figure 4:
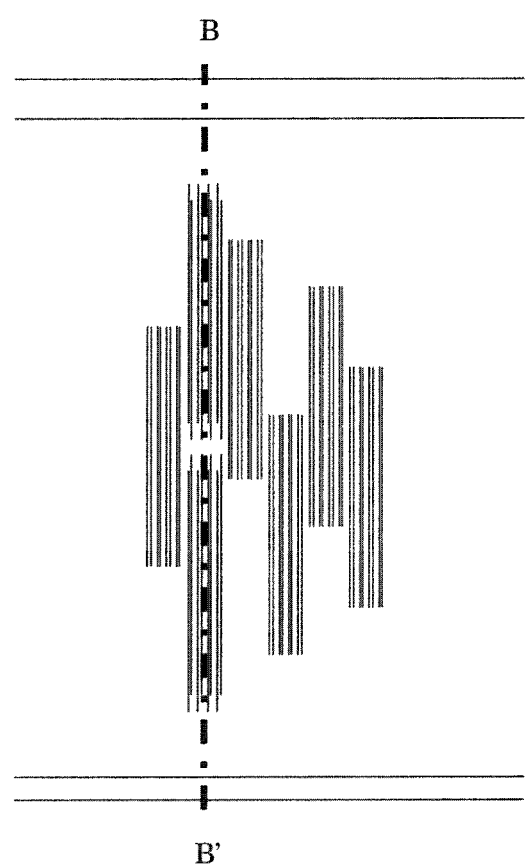
FIG. 4 shows an example arrangement pattern of the restriction yarns of the present invention in which one of a pair of restriction yarns is organized partially offset from the other restriction yarn of the pair in a parallel manner.
Figure 5:
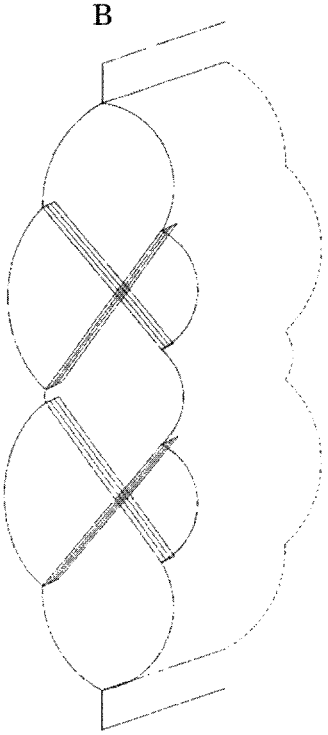
FIG. 5 shows a cross-sectional shape of an inflated state of an air-bag with the arrangement pattern of the restriction yarns in FIG. 4 taken along a line B-B'.

FIG. 4 shows an example arrangement pattern of the restriction yarns of the present invention in which one of a pair of restriction yarns is organized partially offset from the other restriction yarn of the pair in a parallel manner. FIG. 5 shows a cross-sectional shape of an inflated state of an air-bag with the arrangement pattern of the restriction yarns in FIG. 4 taken along a line B-B'.

Figure 6:
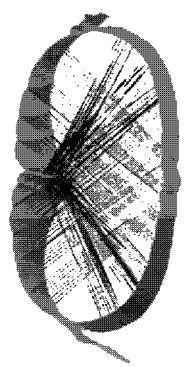
FIG. 6 shows a cross-sectional shape of a deployed state of the air-bag of the present invention.
Figure 7:
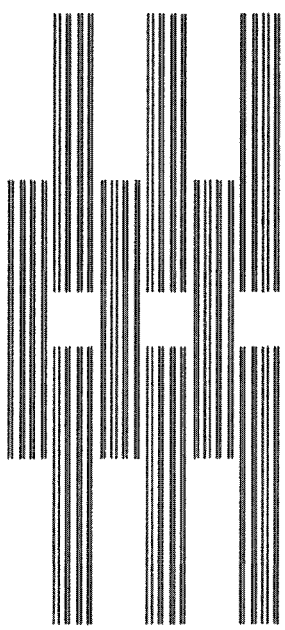
FIG. 7 shows an example arrangement pattern of the restriction yarns of the present invention.
Figure 8:
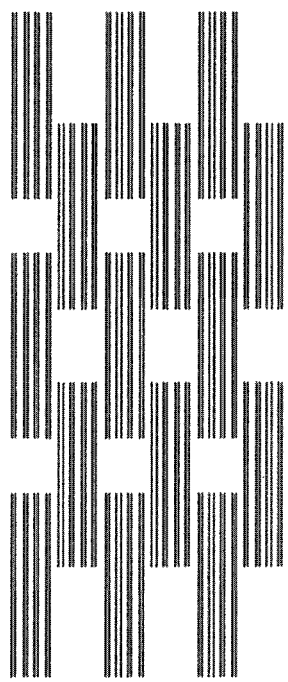
FIG. 8 shows an example arrangement pattern of the restriction yarns of the present invention.

The inflation portion is inflated asymmetrically between the vehicle body side and the occupant side as in FIG. 5 by arranging the restriction yarns partially offset from each other in a manner parallel to the restriction yarns as in FIG. 4. When inner pressure of the air-bag is further increased, the inflation portion can be flattened on the side abutted to the occupant as shown in FIG. 6 and have a recessed portion on the other, vehicle body side.

The parts to be flattened and to be formed into the recessed portion when the air-bag is deployed are controlled depending on how the restriction yarns and the blocks of the restriction yarns are offset from one another.

Figure 9:
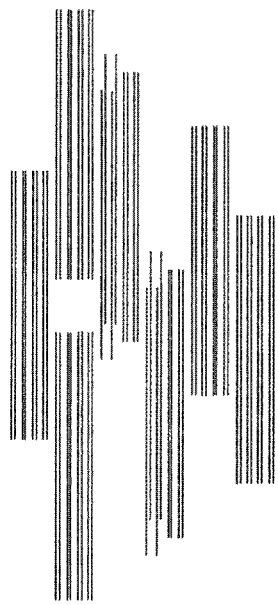
FIG. 9 shows an example arrangement pattern of the restriction yarns of the present invention in which a pair of restriction yarns are offset from each to other in a block of restriction yarns.

FIGS. 7 to 11 each show an example arrangement pattern of the restriction yarns of the present invention. FIG. 9 shows a case where some restriction yarns are offset from the other restriction yarns in a parallel manner within the same block. Even if the starting points of the restriction yarns are thus different within a block, it is possible to control the parts to be formed into the flattened surface and the recessed portion within the inflation portion of the air-bag.

Figure 10:
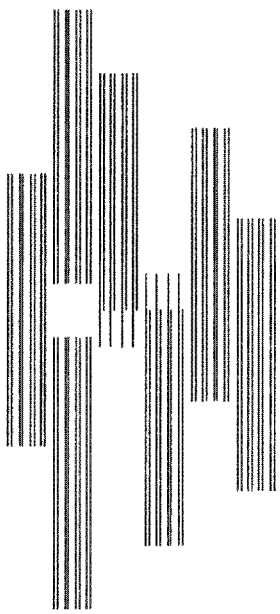
FIG. 10 shows an example arrangement pattern of the restriction yarns of the present invention in which some restriction yarns are organized shorter than the restriction yarns forming pairs with the former.

FIG. 10 shows a case where some restriction yarns are made shorter than the restriction yarns forming pairs with them. Even if the lengths are thus varied within a pair of restriction yarns, it is possible to control the parts to be formed into the flattened surface and the recessed portion within the inflation portion of the air-bag.

Figure 11:
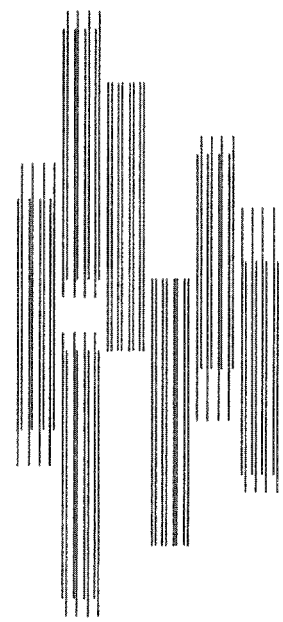
FIG. 11 shows an example arrangement pattern of the restriction yarns of the present invention in which the arrangement pattern in which a pair of restriction yarns are organized as they are offset from each other and the arrangement pattern in which pairs of restriction yarns each have different lengths are combined.

FIG. 11 shows an example of a case where the arrangement pattern in which the restriction yarns are offset from each other within each pair and the arrangement pattern in which one restriction yarn of each pair is made shorter than the other restriction yarn are combined.

The air-bag of the present invention is intended to become almost flattened at the part that comes into contact with the occupant, and more preferably, has a recessed portion formed at a part of the bag. The arrangement patterns of the restriction yarns are not limited to those listed above.

The air-bag of the present invention receives the occupant at the flattened surface of the bag upon collision with the occupant. Since the contact area is increased between the occupant and the bag at an early stage of the collision, the occupant protection performance is improved.

In addition, a usual air-bag is deformed by the collision with the occupant and is reduced in capacity. As a result, inner pressure of the bag rises and bag reaction force increases. Accordingly, the air-bag tends to cause more injury to the occupant. In the air-bag of the present invention, however, the restriction yarns become loose upon collision with the occupant and the recessed portion of the bag expands to suppress excessive increase in the inner pressure, causing less injury to the occupant.

Also, the air-bag of the present invention is characteristic in that it provides a wide protection area while suppressing the increase in capacity of the air-bag. As a result, a general-purpose bag can be designed that is not influenced by a structural shape that varies from vehicle to vehicle.

A fiber material for the restriction yarns used in the present invention may be any material as long as it has shrinkage characteristics and elongation characteristics equivalent to those of the base fabric yarn forming the base fabric, although use of the same material as the base fabric yarn provides an air-bag with uniformed physical properties and also improves the quality such as flatness, which also improves processability in applying, for example, a coating material imparting airtightness. Consequently, characteristics such as retention of airtightness and pressure resistance at the time of the inflation or when the occupant abuts against the air-bag become more preferable.

The length of the restriction yarns in the present invention may be selected from the range of from 50 mm to 250 mm, and preferably selected from the range of from 100 mm to 200 mm. While the fineness of the restriction yarns is not specifically limited, it is preferably greater than that of the base fabric yarn organizing the base fabric by 20% to 60%, further preferably by 30 to 50%, in order to prevent the air-bag from being broken by pressure at the deployment. If the fineness is less than 20%, the effect of preventing breakage cannot be obtained enough, while if the fineness is more than 60%, it is difficult to weave the base fabric uniformly in weaving, possibly causing uneven application in coating of the base fabric with a coating material such as a silicone resin to impair the airtightness of the air-bag. Alternatively, a fiber yarn which is formed by bundling two or more yarns with a fineness smaller than that of the base fabric yarn into a yarn thicker than the base fabric yarn may be used as the restriction yarn.

In the present invention, the distance between the restriction yarns is such that a base fabric on one side preferably has about one restriction yarn within a width of from 1 mm to 5 mm, and more preferably has about one restriction yarn within a width of from 2 mm to 3 mm. A small number of restriction yarns cannot withstand the pressure at the air-bag deployment and are easily broken, and also cannot ensure flatness at the air-bag deployment.

In the present invention, the restriction yarn blocks each preferably have a width of about 3 mm to 40 mm, and more preferably about 5 mm to 20 mm. If the restriction yarn blocks are too narrow, they cannot withstand the pressure of the air-bag deployment and are easily broken. On the other hand, if the restriction yarn blocks are too wide, the flatness of the air-bag surface tends to be deteriorated.

In the present invention, the distance between the restriction yarns blocks is not specified, and the restriction yarn blocks may be arranged as appropriate according to a required flatness. For example, the distance between the shorter sides of adjacent blocks is preferably made no longer than the length of the restriction yarns, and more preferably equal to or shorter than one half of the length of the restriction yarns. Also, the distance between the longer sides of adjacent blocks is 1 to 50 mm, and more preferably about 1 to 25 mm.

The fineness of the warp and the weft of the base fabric used in the present invention may be selected from the thickness of the yarns typically used for an air-bag base fabric, that is, the range of from 150 to 1000 dtex, and preferably within the range of from 235 to 700 dtex. If the fineness is smaller than 150 dtex, the resulting base fabric tends to hardly achieve the strength required for air-bag, and if the fineness is greater than 1000 dtex, the resulting base fabric tends to have excessive mass per unit area.

The yarns used in the present invention may have a strength of 7 cN/dtex or more, and preferably 8 cN/dtex or more. The yarns preferably have a single filament thickness within the range of from 0.5 to 6 dtex. A cross-sectional shape of the single filament may be selected as appropriate from circular, elliptical, flat, polygonal, hollow, and other shapes as long as it causes no problem to manufacturing and properties of the base fabric. Also, a plurality of yarns with different finenesses and cross-sectional shapes may be combined by doubling, twisting, for example, to be used.

The base fabric used in the present invention preferably has a mass per unit area of 260 g/m$^2$ or less, and a tensile strength of 650 N/cm or more. A base fabric with a mass per unit area and a tensile strength within the ranges above is lightweight and excellent in physical properties. Here, the term mass per unit means the weight of an unprocessed base fabric before application of an impervious material to be described later, and the like.

In the base fabric has a mass per unit area of more than 260 g/m$^2$, the air-bag is increased in weight and hardly achieves a desired weight reduction. Also, if the base fabric has a tensile strength of 650 N/cm or less, the air-bag could fail to achieve required physical properties.

The base fabric used in the present invention preferably has a cover factor, which is an index of the denseness of the woven fabric structure, of 700 or more, and more preferably 750 or more.

The cover factor (CF) is typically obtained by the product of the woven fabric density N (number/cm) with the thickness D (dtex) of the warps and the wefts of the base fabric, and expressed by the following expression.

$$CF = N_w \times \sqrt{D_w} + N_f \times \sqrt{D_f}$$

Here, Nw and Nf are respectively the weave densities (number/cm) of the warps and the wefts, and Dw and Df are respectively the thicknesses (dtex) of the warps and the wefts.

The hollow weave of the present invention can be manufactured by a weaving machine with a jacquard device. The weft inserting method may be selected as appropriate from those of various weaving machines used for weaving ordinary industrial fabrics including a shuttle weaving machine, a water-jet weaving machine, an air-jet weaving machine, a rapier weaving machine, and a projectile weaving machine.

The fiber yarns constituting the air-bag base fabric of the present invention may include natural fibers, chemical fibers, inorganic fibers, and are not specifically limited. In particular, synthetic fiber filaments are preferable from the viewpoint of its general-purpose use, manufacturing processes of the base fabric, and the properties of the base fabric. For example, one or two or more fibers may be selected from aliphatic polyamide fiber obtained by polymerization, copolymerization, or blending of nylon 6, nylon 66, nylon 46, nylon 610, nylon 612, and the like, copolymerized polyamide fiber of an aliphatic amine represented by nylon 6T, nylon 6I, and nylon 9T and an aromatic carboxylic acid, polyester fiber obtained by polymerization, copolymerization, or blending of polyethylene terephthalate, polytrimethylene terephthalate, polybutylene terephthalate, polyethylene naphthalate, and the like, ultra-high molecular weight polyolefin fiber, chlorofiber such as vinylidene and polyvinyl chloride, fluorine-based fiber containing polytetrafluoroethylene, polyacetal-based fiber, polysulfone-based fiber, polyphenylenesulfide-based fiber (PPS), polyetheretherketone-based fiber (PEEK), wholly aromatic polyamide fiber, wholly aromatic polyester fiber, polyimide-based fiber, polyetherimide-based fiber, polyparaphenylenebenzobisoxazole-based fiber (PBO), vinylon-based fiber, acrylic-based fiber, cellulose-based fiber, silicon carbide-based fiber, alumina-based fiber, glass-based fiber, carbon-based fiber, steel-based fiber, and the like. Particularly, nylon 66 fiber and polyester-based fiber are preferable in terms of physical properties, durability, and heat resistance. Also, polyester-based fiber and nylon 6 fiber are also preferable from the viewpoint of recycling.

These fiber yarns may contain one or two or more additives as selected from typically used various additives for improving spinnability, processability, and durability. Examples of the additives include heat stabilizers, antioxidants, light stabilizers, aging retarders, lubricants, smooth finishing agents, pigments, water-repellents, oil-repellents, masking agents such as titanium oxide, lustering agents, fire retardants, plasticizers, and the like. Moreover, the yarns may be process by twisting, bulking, crimping, winding, and sizing. Furthermore, the yarns may be in the form of staple spun yarns other than the form of continuous filaments, or composite yarns thereof.

The base fabric used in the present invention preferably has an impervious material in terms of ensuring airtightness of the air-bag. The impervious material is a material that substantially prevents air from passing therethrough as described below, for example, and the term impervious means providing a zero reading in Frazier method of JIS L1096 (Testing methods for woven and knitted fabrics). The material is applied to the base fabric from one or both sides of it by a method to be described later. The impervious material may be interposed any of the surface of the base fabric, intersection portions of the staple spun yarn bundles constituting the base fabric, gap portions of the fiber single yarns, or the like.

The material may be anything typically used for air-bag base fabric if it satisfies, for example, the heat resistance, the wear resistance, the adhesion to the base fabric, the flame retardancy, and the tack freeness. As the material, one or two or more materials out of silicone-based resins or rubbers, polyurethane-based resins or rubbers (including those modified with silicone or fluorine), fluorine-based resins or rubbers, chlorine-based resins or rubbers, polyester-based resins or rubbers, polyamide-based resins or rubbers, epoxy-based resins, vinyl-based resins, urea-based resins, phenol-based resins, olefin-based resins, and the like may be used. Among them, silicone resins, polyamide-based resins, polyester-based resins, polyurethane-based resins, and the like are preferable in terms of the heat resistance and the flame retardancy.

The application method may include 1) a coating method (e.g., knife, kiss, reverse, comma, slot die, or lip), 2) a dipping method, 3) a printing method (e.g., screen, roll, rotary, or gravure), 4) a transferring method (transfer), 5) a laminating method, and combinations thereof. Among them, the coating method and the laminating method are preferable in that the obtained base fabric effectively maintains the inner pressure.

When adopting the coating method, the application amount for one surface is preferably 10 to 150 $g/m^2$, and more preferably 50 to 100 $g/m^2$. If the material forms a layer, the layer preferably has a thickness of 10 μm or more. If the application amount for one surface is less than 10 $g/m^2$ or the material layer has a thickness of less than 10 μm, the obtained base fabric tends to be difficult to achieve the required airtightness.

When adopting the laminating method, the processing method is not specifically limited, and known methods are available including a dry lamination method in which an adhesive is applied onto a base fabric or a film and dried to evaporate the solvent and then the lamination is thermocompressed, a wet lamination method in which a water-soluble adhesive is applied to a base fabric or a film to bonded them together, and then the adhesive is dried, an extrusion lamination method in which a molten resin is extruded onto a base fabric before laminating the base fabric and a film, a thermal lamination method in which a resin layer formed in a film shape in advance is laminated and then the lamination is thermocompressed, and the thermal lamination method is preferable from the viewpoint of processing costs and ecology.

The material to be laminated is not specifically limited, and known materials can be used including homopolymers or copolymers of polyester-based resins, polyamide-based resins, polyolefin-based resins, copolymers of these resins with other materials, and modifications thereof. Also, known methods can be used such as processing the material with an adhesion imparting agent like a polyolefin-based resin in advance, or processing a base fabric with a film having an adhesive layer placed on one surface thereof. Examples of thermoplastic resins used as the adhesive layer include homopolymers and copolymers of polyamide-based resins, polyolefin-based resins, polyurethane-based resins, copolymers of these resins with other materials, and modifications thereof that have a melting point of 200° C. or lower.

The thickness of the lamination coating material is not specifically limited, and may be appropriately set within the range of from 10 to 100 μm according to the application. In general, a thickness of from 10 to 40 μm is preferable for a curtain bag that is not intended for overturn of the automobile, and a thickness of from 40 to 100 μm is preferable for a hollow weave curtain bag that is also intended to protect the occupants in case of overturn of the automobile.

The material may have one or two or more additives mixed thereto as selected from typically used various additives for improving the processability, the adhesiveness, the surface properties, the durability or the like, in addition to the main material. Examples of the additives include cross-linking agents, tackifiers, reaction accelerators, reaction retarders, heat stabilizers, antioxidants, light stabilizers, aging retarders, lubricants, smooth finishing agents, anti-block gents, pigments, water-repellents, oil-repellents, masking agents such as titanium oxide, lustering agents, fire retardants, plasticizers, and the like.

The properties of the material as a solution may be selected as appropriate from solventless type, solvent type, water dispersion type, water emulsion type, and water soluble type in accordance with the application amount, the application method, the processability or stability of the material, the required characteristics, and the like.

Various pre-treatment agents, adhesion improvers, and the like may be added to the material in order to improve adhesion with the base fabric, or the surface of the base fabric may be pre-treated with a primer treatment or the like. Further, in order to improve the physical properties of the material or impart heat resistance, aging resistance, antioxidant properties, and the like, after application of the material to the base fabric, it may be dried, cross-linked, vulcanized, for example, by hot air treatment, pressurized heat treatment, high energy treatment (high frequency, electron beam, UV ray), or the like.

In hollow weaving, the base fabric is typically woven using sized original yarns as warps, and in order to remove an oil solution, a sizing agent, and the like adhering to the original yarns, so as not to inhibit adhesiveness of the coating agent or laminating material to the base fabric, the base fabric is preferably scoured by a jigger scouring machine or a continuous scouring machine with a plurality of scouring baths prior to the coating. After scoring, the base fabric is dried with a cylinder dryer, for example. After drying, the base fabric is directly subjected to the next coating step or laminating process in some cases, but they are preferably heat set following the scouring and the drying for adjusting the dimension and the woven fabric density.

After coating or lamination processing, the base fabric is cut to predetermined dimensions and a shape by a laser cutter, undergoes some process such as sewing accessories like a strap for fixing the air-bag, to the base fabric and reinforcing a mounting portion to the vehicle body, and after that the base fabric is made into a product.

The specifications, shape, and capacity of the air-bag of the present invention may be selected according to the part to which the air-bag is disposed, its application, the storage space, the performance of absorbing occupant impact, the output of the inflator, and the like.

For restricting protrusion of the air-bag toward the occupant and controlling the thickness during the inflation, the air-bag may be provided with a tether or a gas flow adjustment cloth on the inside and a strip-shaped cloth or a holding cloth called a flap on the outside.

Figure 12A:
FIG. 12A shows an example weave of a joining portion close to a border with an inflation portion.
Figure 12B:
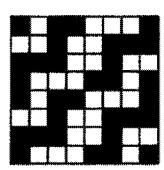
FIG. 12B shows an example weave of the joining portion close to the border with the inflation portion.
Figure 12C:
FIG. 12C shows an example weave of the joining portion close to the border with the inflation portion.
Figure 13:
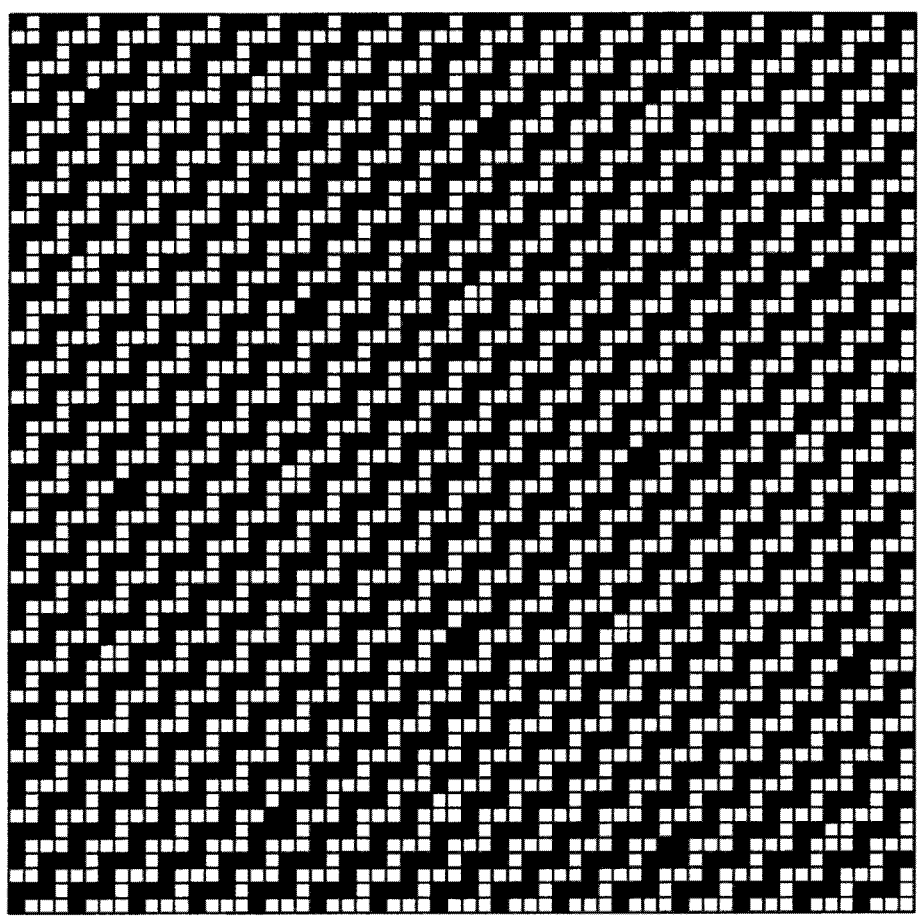
FIG. 13 shows an example weave of the joining portion other than the vicinity of the border with the inflation portion.

In hollow weaving, the weave at the joining portion close to the border with the inflation portion is not specifically limited, and various weaves such as (A) mat weave, (B) reversible figured weave, and (C) plain weave as shown respectively in FIGS. 12A, 12B, and 12C may be combined and repeated as appropriately. The weave at the joining portion other than the vicinity of the border with the inflation portion is not specifically limited, and for example, partial knot weave as shown in FIG. 13 is preferable in that it reduces the number of cross-over points.

The weave of the inflation portion except the vicinity of the border between the joining portion and the inflation portion usually adopts plain weave.

A heat-resistant protective cloth for protection against hot gas or a mechanical reinforcing cloth may be provided around the inflator nozzle according to the characteristics of the inflator to be used. The protective cloth and reinforcing cloth may be formed from a base fabric that is formed from a heat resistant material like a heat resistant fiber material such as wholly aromatic polyamide fiber, wholly aromatic polyester fiber, PBO fiber, polyimide fiber, or fluorine-containing fiber, or a base fabric manufactured separately using yarns having a thickness that is equal to or thicker than that of the air-bag base fabric. Also, a base fabric to which a heat resistant coating material has been applied may be used.

The air-bag may be folded in such manner as folding screen fold of folding the air-bag from the center symmetrically in vertical or horizontal direction or fold of compressing the air-bag toward the center in several directions as in the driver's seat air-bag, roll fold, bellows fold, or fanfold fold in a folding screen like manner as in the front-passenger's seat air-bag, combination thereof, alligator fold as in the side bag built into the seat, or roll fold or bellows fold as in the side curtain air-bag.

The air-bag of the present invention can be applied into several applications in passenger vehicles, commercial cars, buses, and motorcycles such as several occupant protection bags including side bags and side curtain air-bags at the driver's seat and the front-passenger's seat for head-on collision or side collision, head rest bags for rear seat protection, rear-end collision protection, knee bags and foot bags for leg portion and foot portion protection, mini-bags for infant protection (child seat), bags for air-belts, and air-bags for pedestrian protection, and also can be applied to other variety of applications in ships, trains and electric trains, planes, and amusement facilities if the air-bag is functionally satisfactory.

EXAMPLES

Hereinafter, the present invention will be described further specifically based on Examples.

Example 1 and Comparative Example 1

Figure 14:
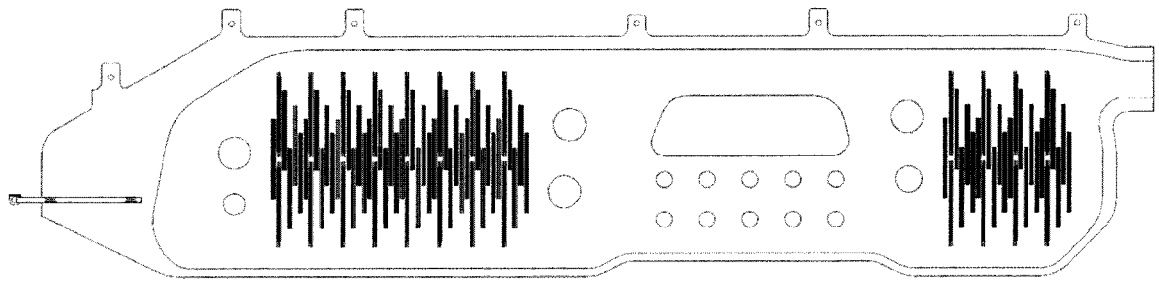
FIG. 14 shows an example of a curtain air-bag with restriction yarns to which the present invention is applied.
Figure 15:
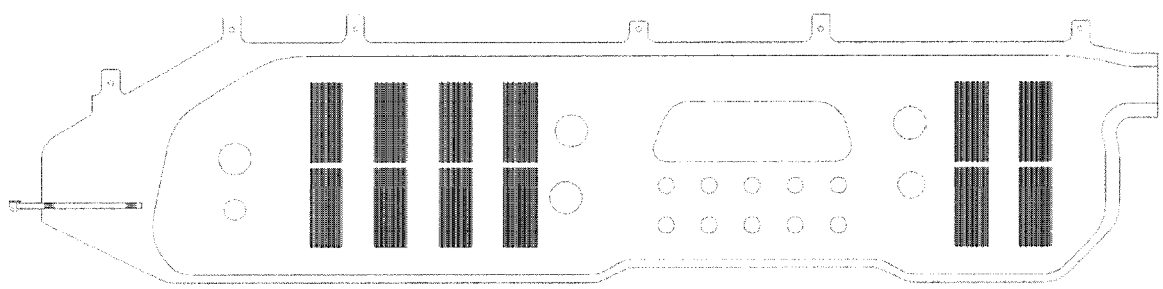
FIG. 15 shows a curtain air-bag as a comparative example in which adjacent blocks of restriction yarns are not offset from each other.

FIG. 14 shows the configuration of the curtain air-bag used in Example 1. The restriction yarns are arranged by repeating the pattern shown in FIG. 4. FIG. 15 shows an air-bag used as Comparative Example 1 in which adjacent restriction yarn blocks are arranged without being offset from each other.

Figure 16:
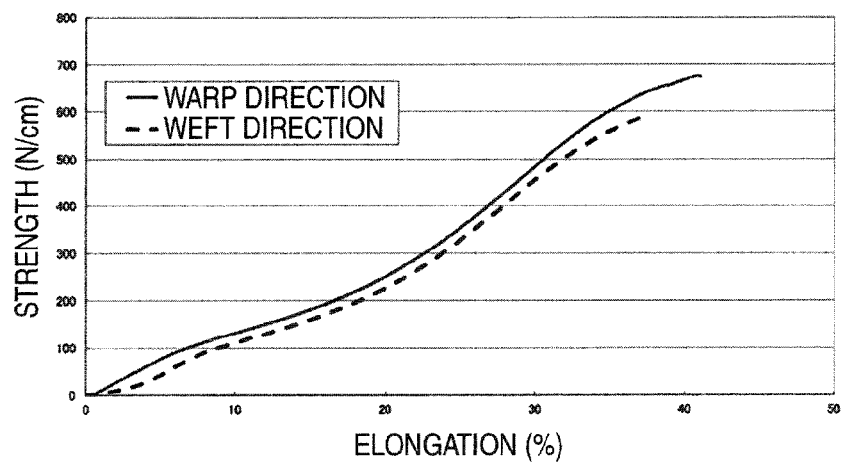
FIG. 16 shows the stretch and elongation characteristics of an air-bag base fabric used as a simulation model.

Example 1 and Comparative Example 1 were evaluated by a computer simulation (ESI Group, PAM-CRASH). The stretch and elongation characteristics obtained from the base fabric properties shown in FIG. 16 were used as the physical properties of the air-bag used as the simulation model. Injury criterion values of the occupant at a collision were analyzed by bringing a head mimicking impactor 13 that weighed 4.6 kg into collision with the air-bags that had been inflated at a uniform pressure (an initial pressure of 30 kPa) at 34 km per hour, and comparing accelerations caused to the impactor 13. A wall surface of a rigid body was assumed to be a side forming a vehicle body. The results of the analysis are shown in Table 1.

Figure 17:
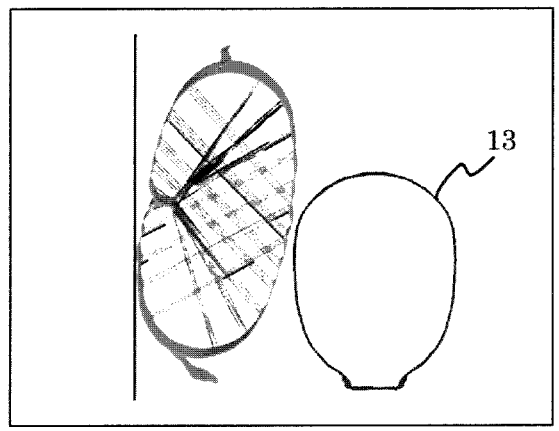
FIG. 17 shows a cross-sectional shape of the air-bag in FIG. 14 that has been deployed and has not abutted against an impactor 13 yet.
Figure 18:
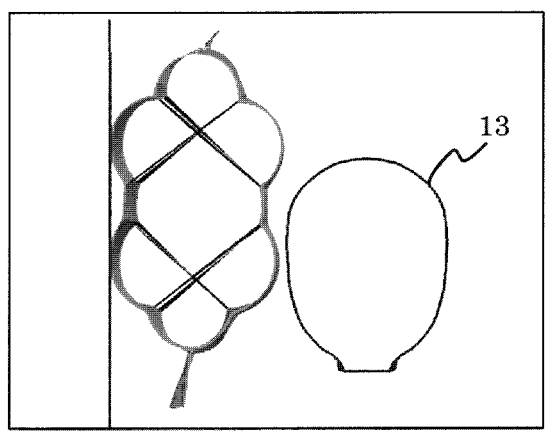
FIG. 18 shows a cross-sectional shape of the air-bag in FIG. 15 that has been deployed and has not abutted against the impactor 13 yet.

FIG. 17 and FIG. 18 respectively show cross-sectional shapes of the air-bags of Example 1 (FIG. 14) and Comparative Example 1 (FIG. 15) that are in the inflated state. Comparison of the cross-sectional shapes of the air-bags of FIG. 17 and FIG. 18 shows that the surface of the air-bag in FIG. 17 at which the air-bag is to abut against the occupant is flat compared with that of the air-bag in FIG. 18. Also, the air-bag of FIG. 17 has a recessed portion on the side that is not to abut against the occupant.

Figure 19:
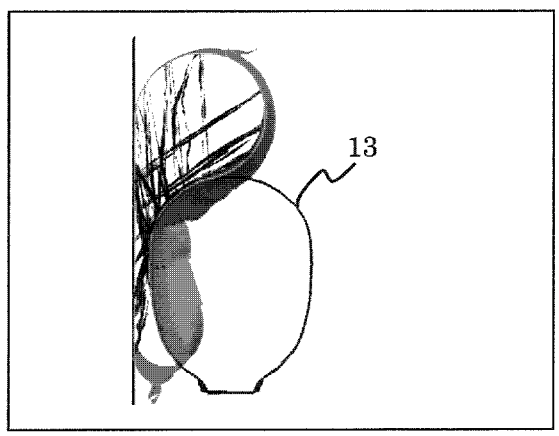
FIG. 19 shows a cross-sectional shape of the air-bag that has abutted against the impactor 13 from the state shown in FIG. 17.

FIG. 19 shows a cross-sectional shape of the air-bag of Example 1 in collision with the occupant. It can be observed that the recessed portion that had been formed on the opposite side to the collision surface has been stretched out at the collision with the occupant. Such a design of stretching, at a collision, a recessed portion formed in advance provides an effect of minimizing the capacity change at an occupant collision to suppress excessive increase of the inner pressure.

Figure 20:
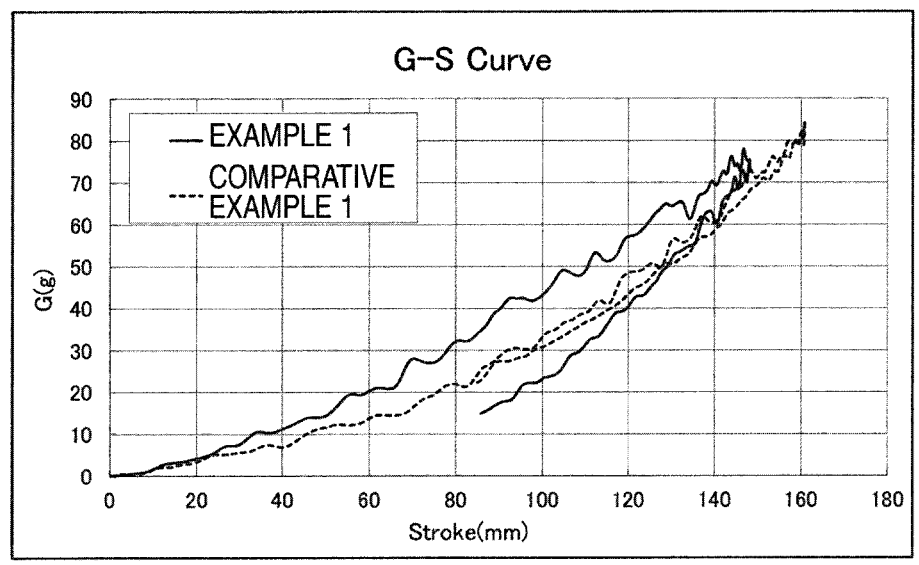
FIG. 20 expresses an acceleration G caused to the impactor 13 when the impactor 13 is abutted against the air-bag in Example 1.

FIG. 20 shows analysis results of the acceleration changes at the collision of the impactor 13 to each of the air-bags in Example 1 and Comparative Example 1. The vertical axis shows the acceleration G of the impactor 13 and the horizontal axis shows the stroke mm of the impactor 13. The solid line shows the result of Example 1 and the dotted line shows the result of Comparative Example 1.

Comparison of the accelerations G in the graph caused to the impactor 13 in Example 1 and Comparative Example 1 shows that the acceleration G rises faster in Example 1, which means that the air-bag in Example 1 absorbs the energy of the impactor 13 more efficiently. Also, the efficient energy absorption shortens the stroke from abutting against the impactor 13 to absorbing all the energy.

Figure 21:
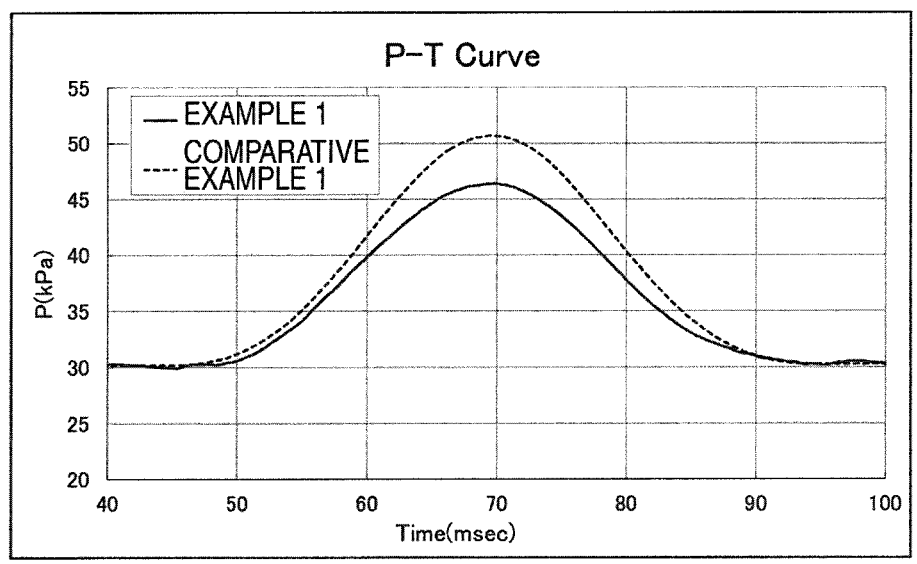
FIG. 21 expresses changes in inner pressure of the air-bag caused when the impactor 13 is abutted against the air-bag in Example 1.

FIG. 21 shows a graph of inner pressure change of the air-bags in Example 1 and Comparative Example 1. In Example 1, the air-bag pressure is lower than that in Comparative Example 1. It is believed that this is because the recessed portion of the air-bag formed on the side opposite to the side to be abutted against the occupant is stretched out at the occupant collision to increase the air-bag capacity, providing the effect of reducing the pressure increase of the air-bag at the occupant collision.

The calculation result of Head Injury Criterion (HIC) shows that the head injury criterion value of the air-bag of Comparative Example 1 is 812, while that of air-bag of Example 1 is 678, which means the air-bag of Example 1 also had the lower injury criterion value to the occupant. Here, the term HIC means an injury index obtained from changes in the acceleration of the impactor 13 over time. The smaller criterion means the less injury.

As described above, it has been observed that the air-bag of Example 1 provides a high occupant protection performance from the beginning of the abutment between the occupant and the air-bag compared with the air-bag of Comparative Example 1. Further, it has also been observed that in Example 1, the injury criterion value to the occupant was kept low by forming the recessed portion on a part of the air-bag.

Example 2

Nylon 66 yarn (470 dtex/72 filaments) manufactured by Asahi Kasei Fibers Corporation was used for forming the base fabric. Warps were sized with a sizing agent mainly containing polyacrylic acid, and the Nylon 66 yarns that are the same as those used as the warps but are not sized were used as wefts. A One Peace Woven (OPW) woven fabric was woven to have a finished density of 57 warps/2.54 cm and 49 wefts/2.54 cm with an Air-jet weaving machine (manufactured by Lindauer DORNIER GmbH) equipped with a Jacquard machine (manufactured by Stäubli KK). The restriction yarns were arranged such that they had a length of 150 mm and were each arranged at every 2 mm and such that the restriction yarn blocks had a width of 10 mm, the distance between the longer sides of adjacent blocks was 2 mm, and the distance between the shorter sides was 10 mm.

The base fabric thus woven was scoured with a continuous scouring machine, dried, and then heat set (at 180° C. for 1 minute) with a pin tenter. Next, the base fabric was coated with a silicone resin by a knife coating method with a target value of 70 g/m² and processed at 180° C. for 2 minutes, and further, the base fabric was coated with a top coat of 10 g/m² and processed at 200° C. for 1 minute. The base fabric was processed by the foregoing procedure twice in total on the front and back sides.

The obtained coated product was cut into a predetermined shape with a laser cutter (manufactured by Lectra), a mounting portion to the vehicle body of an automobile was reinforced by stitching to prepare a test air-bag. A cold gas system deployment test was carried out using the prepared air-bag. The results are shown in Table 2.

Example 3

A test air-bag was prepared according to Example 2 except that yarns of 700 dtex/105 filaments were used for the lines of yarn forming the restriction yarns, and the air-bag was subjected to a cold gas system deployment test. The results are shown in Table 2.

Comparative Example 2

A test air-bag was prepared according to Example 2 except that yarns of 235 dtex/72 filaments were used for the lines of yarn forming the restriction yarns, and the air-bag was subjected to a cold gas system deployment test. The results are shown in Table 2.

The cold gas system deployment test was carried out as follows. An inner pressure measurement sensor was attached to the test air-bag, and a high-speed deployment test was carried out with a cold gas system deployment tester manufactured by Microsys Technologies Inc. Using helium as the cold gas and an Orifice bar with a diameter of 0.4 inches, the gas has been supplied until the restriction yarns were broken and the pressure at the break was measured. The test was carried out with a pressure accumulation condition of the helium gas in the range of from 7 to 10 MPa according to the inner pressure at break.

The pressure at break of the restriction yarns is high in Examples 2 and 3 compared with that in Comparative Example 2, which means that restriction yarns are less likely to break if they have a fineness equal to or more than that of the yarns forming the base fabric to stabilize the shape of the airbag in the deployed state, and thus the object of the present invention can be achieved.

TABLE 1

|  | Example 1 | Comparative Example 1 |
|---|---|---|
| Stroke (mm) | 148(84) | 177(100) |
| Maximum G (g) | 78(93) | 84(100) |
| Head Injury Criterion (HIC) | 678(83) | 812(100) |
| Air-bag maximum pressure (kPa) | 46(90) | 51(100) |

* numbers within parentheses indicate values obtained taking values in Comparative Example as 100%.

TABLE 2

|  | Example 2 | | Example 3 | | Comparative Example 2 | |
|---|---|---|---|---|---|---|
|  | Warp and weft | Restriction yarn | Warp and weft | Restriction yarn | Warp and weft | Restriction yarn |
| Original yarn | N66 | | N66 | | N66 | |
| Fineness (dtex) | 470 | 470 | 470 | 700 | 470 | 235 |

TABLE 2-continued

|  | Example 2 | | Example 3 | | Comparative Example 2 | |
| --- | --- | --- | --- | --- | --- | --- |
|  | Warp and weft | Restriction yarn | Warp and weft | Restriction yarn | Warp and weft | Restriction yarn |
| Filament number (filaments) | 72 | | 72 | 105 | 72 | 72 |
| Pressure at break of restriction yarn (kPa) | 102 (133) | | 141 (184) | | 77 (100) | |

\* numbers within parentheses indicate values obtained taking values in Comparative Example as 100%.

As described above, the present invention is a bag integrally formed by hollow weaving and having restriction yarns restricting inflation of an inflation portion. The restriction yarns restricts excessive inflation of the inflation portion when the air-bag is deployed to thereby reduce the gas amount of the inflator while providing a wide occupant protection area. Moreover, because the shape of the air-bag in the inflated state is restricted by the restriction yarns, the thickness of the air-bag can be made uniform for the entire air-bag to thereby providing a general-purpose air-bag that is not influenced by a structural shape that varies from vehicle to vehicle. Furthermore, because the surface of the air-bag can be flattened when the air-bag is inflated, the contact area between the air-bag and the occupant becomes large immediately after the collision with the occupant and the energy absorption at the collision with the occupant can be increased to thereby protect the occupant safely.

REFERENCE SIGNS LIST

10 Air-bag integrally formed by hollow weaving
11 Restriction yarn
12 Block including one or more pairs of restriction yarns
13 Impactor

The invention claimed is:

1. A curtain air-bag integrally formed by hollow weaving and including a restriction yarn for restricting inflation on an inside, wherein the restriction yarn has a length selected from 100 mm to 200 mm and extends from a base fabric on one surface of an inflation portion of the air-bag to a base fabric on another surface to connect both of the base fabrics, the restriction yarn extending from the base fabric on the one surface to the base fabric on the other surface and a restriction yarn extending symmetrically from the base fabric on the other surface to the base fabric on the one surface constitute a pair of restriction yarns, one or more restriction yarns are arranged in a block shape to constitute a restriction yarn block, and adjacent restriction yarn blocks are arranged offset from each other in a manner parallel to a direction in which the restriction yarns extend, wherein one of the pair of restriction yarns is organized offset from another one of the pair in a parallel manner, and/or one of the pair of restriction yarns is organized to be shorter or longer than another one of the pair, so that when the curtain air-bag is inflated, a surface of the inflation portion is flattened on a side abutted to an occupant and has a recessed portion on the other vehicle body side.

2. The curtain air-bag according to claim 1, wherein the restriction yarns have a fineness that is larger than a fineness of base fabric yarns organizing the base fabric.

3. A curtain air-bag device using the curtain air-bag according to claim 2.

4. A curtain air-bag device using the curtain air-bag according to claim 1.

* * * * *